Figure 1:
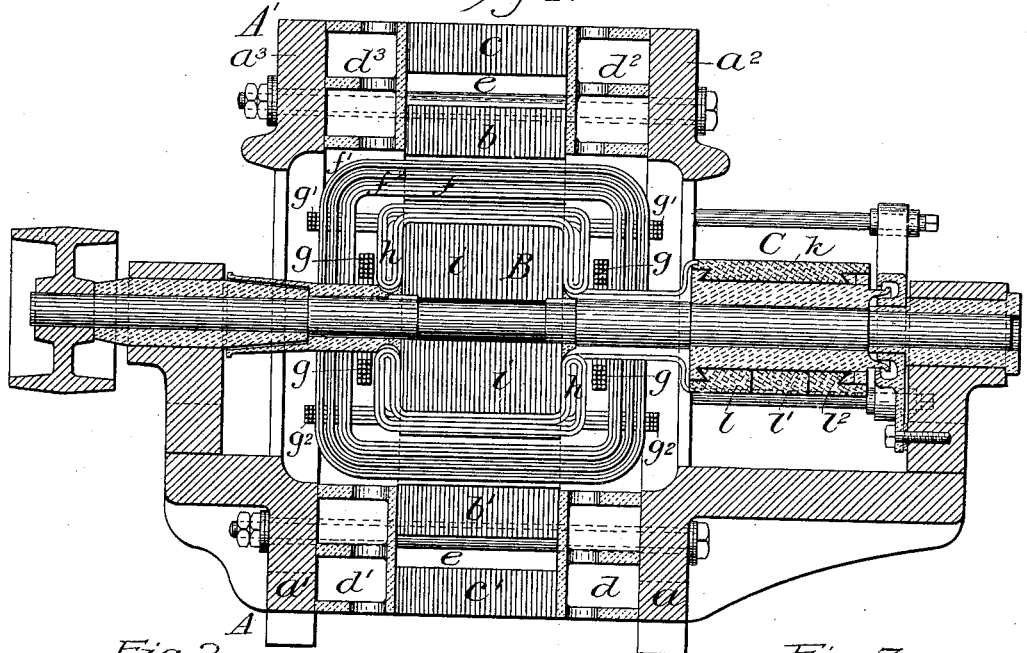

(No Model.) 5 Sheets—Sheet 1.

R. EICKEMEYER, Dec'd.
R. EICKEMEYER, JR., Executor.
ELECTRIC MOTOR.

No. 567,119. Patented Sept. 1, 1896.

Attest:
Howell Barth
Emma E. Marks

Inventor:
Rudolf Eickemeyer
By
Attorney (No Model.)  5 Sheets—Sheet 2.
R. EICKEMEYER, Dec'd.
R. EICKEMEYER, JR., Executor.
ELECTRIC MOTOR.
No. 567,119.  Patented Sept. 1, 1896.
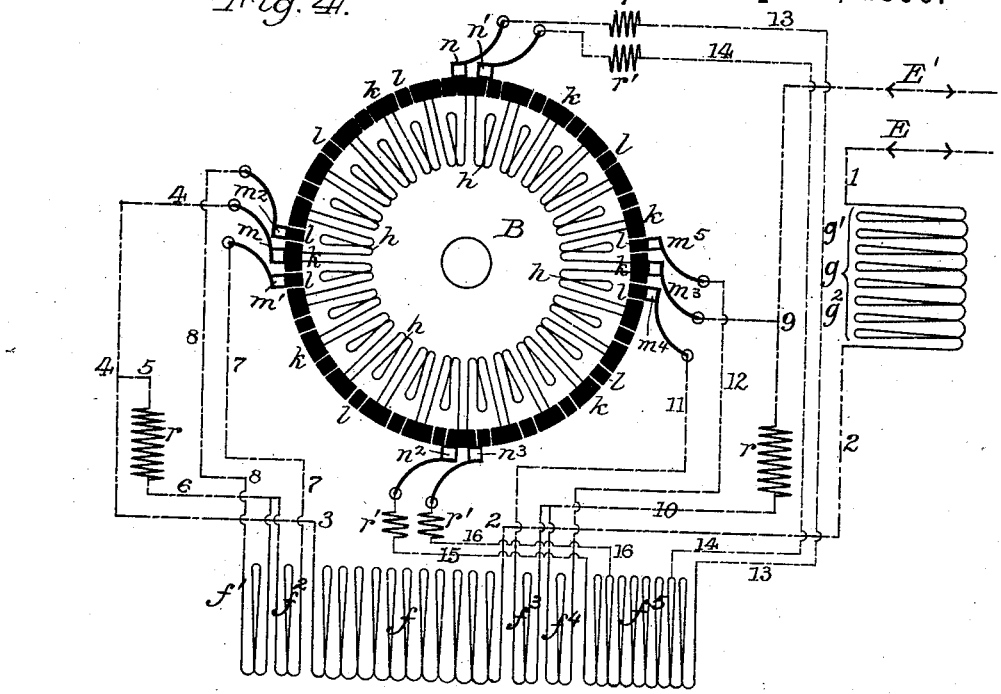
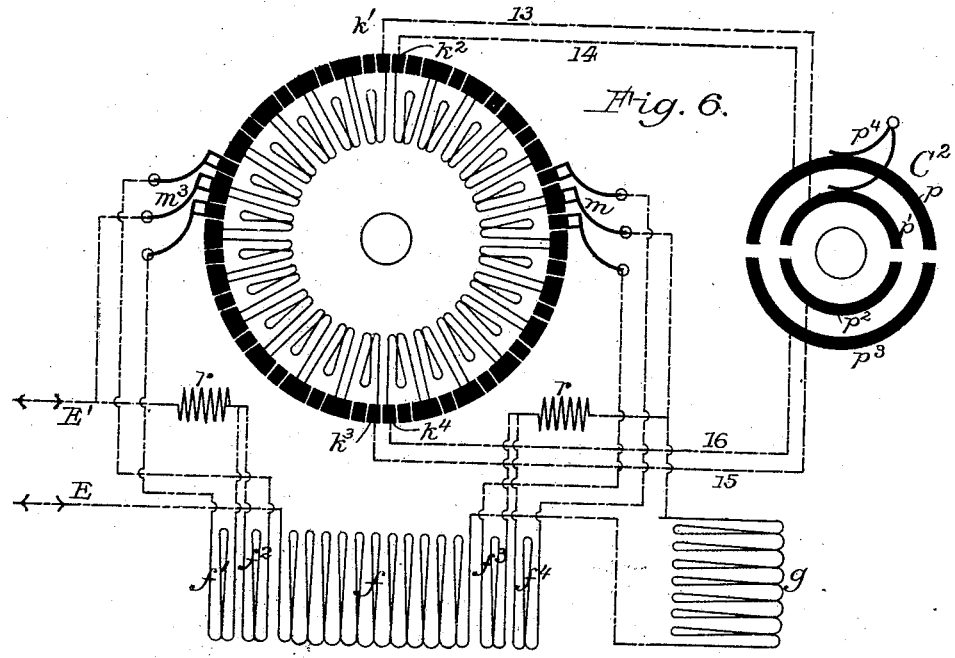
Attest:
Philip F. Larner
Howell Bartle
Inventor:
Rudolf Eickemeyer
By McClord
Attorney (No Model.)    R. EICKEMEYER, Dec'd.    5 Sheets—Sheet 3.
R. EICKEMEYER, Jr., Executor.
ELECTRIC MOTOR.

No. 567,119.    Patented Sept. 1, 1896.

Attest:
Philip F. Larner
Howell Hartte

Inventor:
Rudolf Eickemeyer
By Wm C Ward
Attorney (No Model.) 5 Sheets—Sheet 4.
R. EICKEMEYER, Dec'd.
R. EICKEMEYER, Jr., Executor.
ELECTRIC MOTOR.
No. 567,119. Patented Sept. 1, 1896.
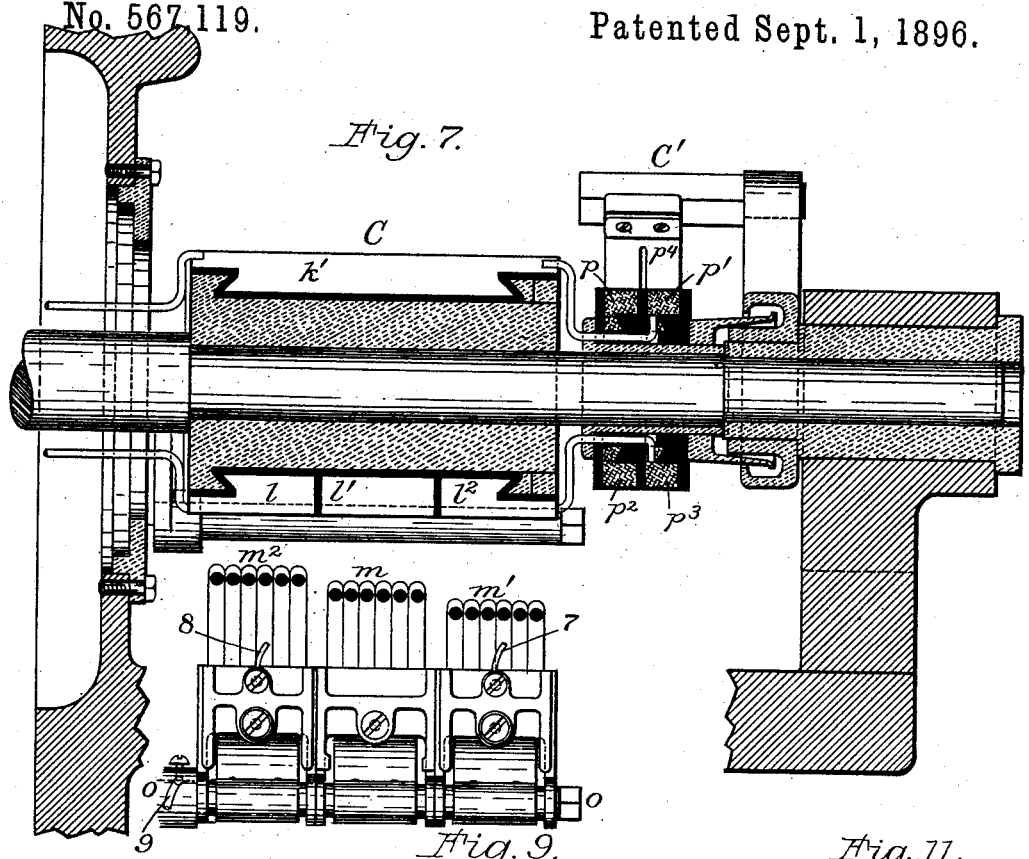
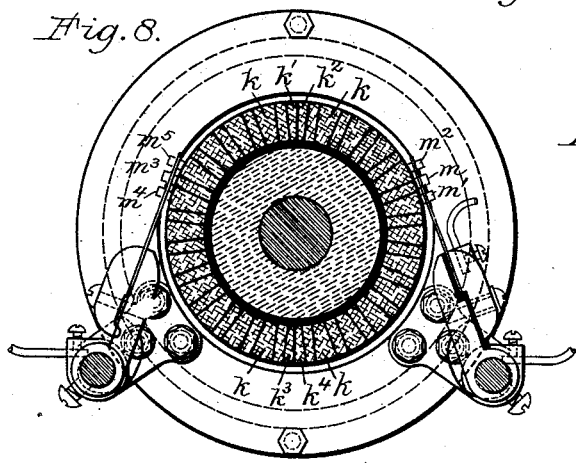
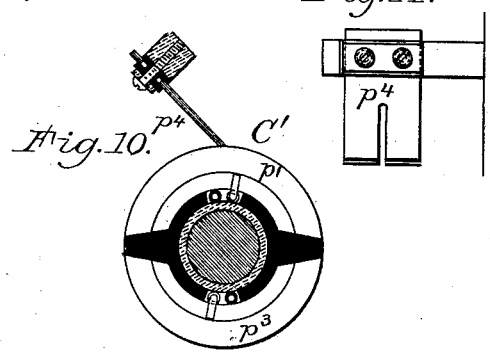
Attest:
Philip F. Larner
Howell Bartle
Inventor:
Rudolf Eickemeyer
By
Attorney (No Model.)  5 Sheets—Sheet 5.
R. EICKEMEYER, Dec'd.
R. EICKEMEYER, JR., Executor.
ELECTRIC MOTOR.
No. 567,119.  Patented Sept. 1, 1896.
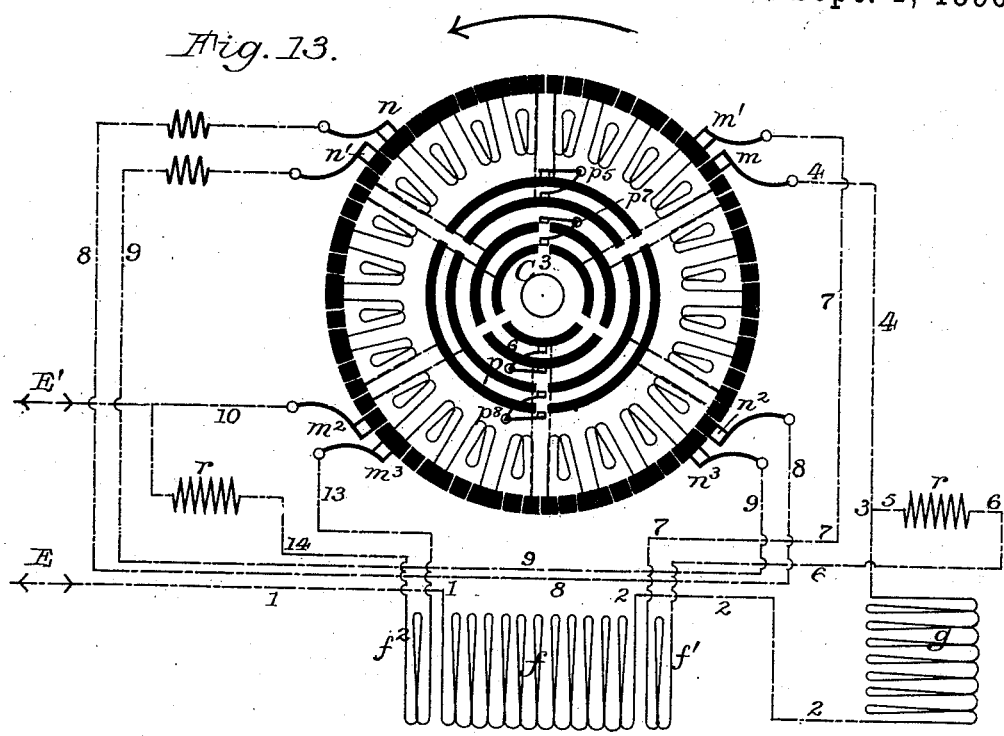
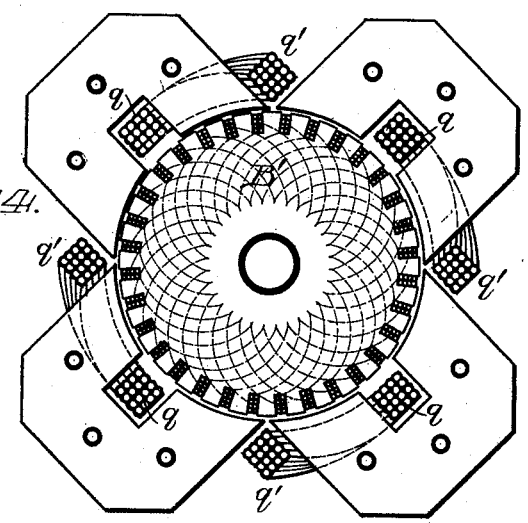
Attest:
Philip F. Larner
Howell Battle
Inventor:
Rudolf Eickemeyer
By [signature]
Attorney

UNITED STATES PATENT OFFICE.

RUDOLF EICKEMEYER, OF YONKERS, NEW YORK; RUDOLF EICKEMEYER, JR., EXECUTOR OF RUDOLF EICKEMEYER, DECEASED.

ELECTRIC MOTOR.

SPECIFICATION forming part of Letters Patent No. 567,119, dated September 1, 1896.

Application filed December 31, 1890. Serial No. 376,361. (No model.)

*To all whom it may concern:*

Be it known that I, RUDOLF EICKEMEYER, of Yonkers, in the county of Westchester and State of New York, have invented certain new and useful Improvements in Electric Motors; and I do hereby declare that the following specification, taken in connection with the drawings furnished and forming a part of the same, is a clear, true, and complete description of certain features of my invention and of organizations embodying the same.

Although motors embodying my present invention are capable of affording service when fed with continuous electric currents they were devised by me with reference to affording specially effective service when fed with alternating currents involving rapid reversals of polarity in the magnetic metal in both the field-magnets and the armature-core.

Motors embodying my invention do not depend for speed of rotation upon the rapidity in the alternation of the current, and they can be governed so as to operate at desired speed. So, also, can they be started under a full load, and, further, as a special feature, if one of my motors should be overloaded and held at rest under a full application of alternate-current pressure, no danger will be involved, and, still further, with my alternating-current motors as another special feature the electromotive force available for actual working service constitutes a very large proportion of the total electromotive force consumed or expended.

After describing the motors illustrated in the drawings, certain features deemed novel will be duly specified in several appropriate clauses of claim and hereunto annexed.

Figures 2, 3:
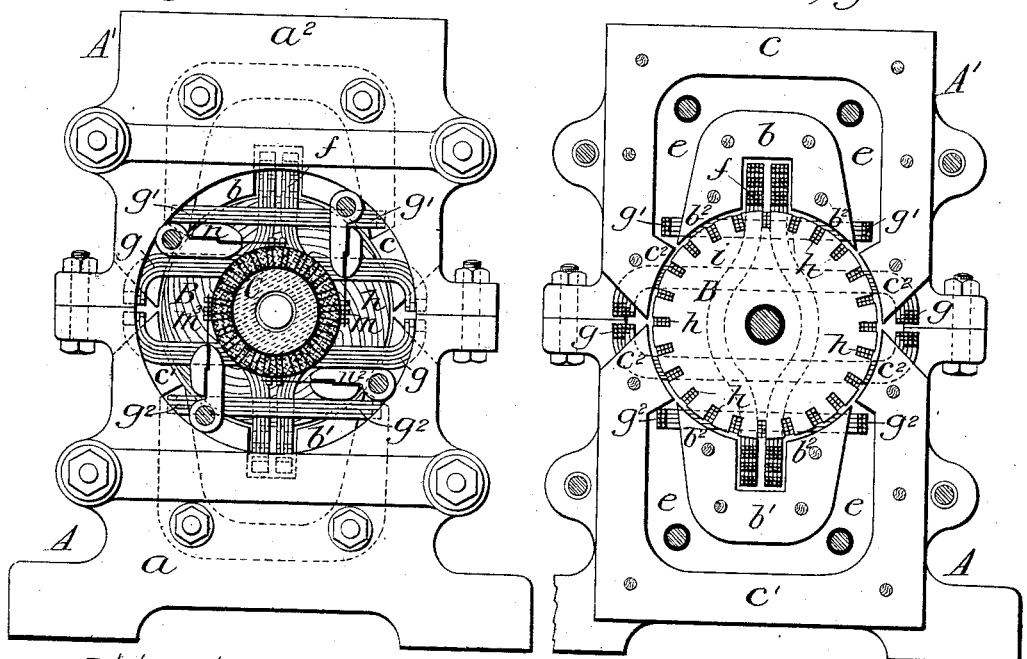
Figure 5:
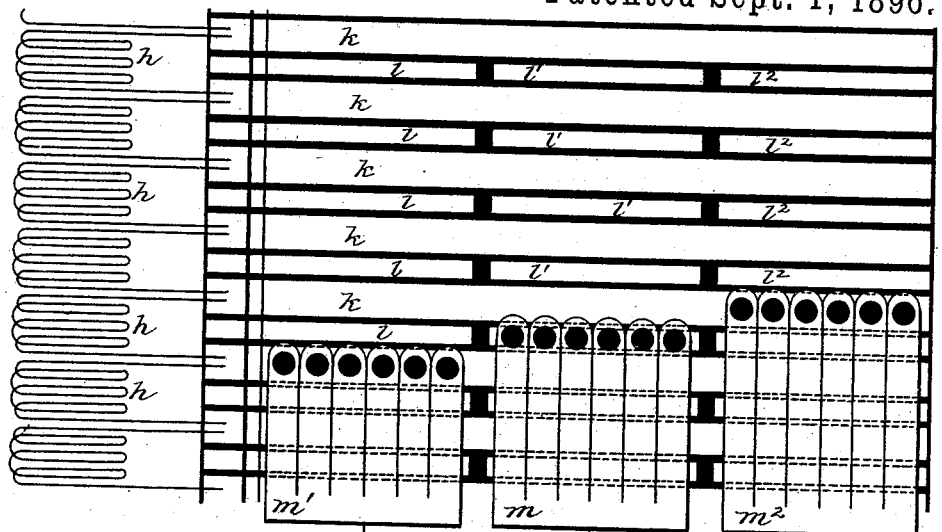
Figure 12:
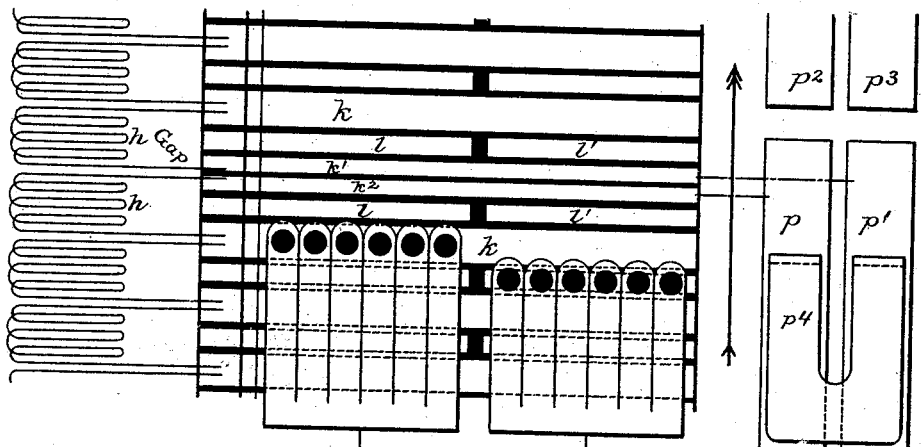

Referring to the drawings, of which there are five sheets, Figure 1, Sheet 1, in central longitudinal vertical section, illustrates the main portions of one of my alternating-current motors of the bipolar type. Fig. 2 is an end view of the same, but with the commutator shown in section. Fig. 3 is a central transverse vertical section. Fig. 4, Sheet 2, is a diagrammatic illustration of the electric and magnetic system of this motor. Fig. 5, Sheet 3, illustrates in plane projection a number of armature-coils, commutator-bars, brushes, one line-wire, and certain appropriate resistances and special coils to be hereinafter fully described. Fig. 6, Sheet 2, is a diagrammatic illustration of the magnetic and electric system of a machine having a commutator in a modified form. Figs. 7 to 11, Sheet 4, illustrate in various views commutators and brushes resembling in substance those illustrated in Fig. 6, but differing in the construction of a portion of the commutator. Fig. 12, Sheet 3, is a plane projection illustrating some armature-coils and another form of commutator and its brushes adapted to a non-reversible motor. Fig. 13, Sheet 5, is a diagrammatic illustration of still another commutating arrangement for a non-reversible motor. Fig. 14, in lateral section, illustrates the main portions of a four-pole machine embodying portions of my invention.

Referring to Figs. 1, 2, and 3, I will first describe the construction of the particular form of my bipolar machine therein illustrated and thereinafter describe the several electrical connections. The armature-inclosing structure of this machine consists of a base portion A and a top portion A'. These two sections are united on a horizontal line in a plane with the axis of the armature-shaft by means of short vertical bolts. The base-section consists in part of two end plates $a\ a'$, each affording a support for the journal-bearings. The top section of this frame consists in part of two end plates $a^2\ a^3$. The field-magnet metal affords separate magnetic circuits and is in four separate masses or bodies $b\ b'$ and $c\ c'$, and these are mounted between four skeletonized non-magnetic plates or brass castings $d\ d'\ d^2\ d^3$, and all are clamped together by means of well-insulated bolts. The masses $b$ and $b'$ are laminated, being composed of carefully-insulated light thin plates of soft iron, each of horseshoe form, and each mass affording concave cheeks or faces at $b^2$, and between said faces there is a central longitudinal rectangular recess, and one of said masses is above and the other below the circular space occupied by the armature B. The masses of iron $c\ c'$ are also laminated, and they are somewhat similar to the masses $b\ b'$ in form, but are square on top, and each is large enough to inclose the adjacent masses $b$ or $b'$ and to afford large intervening spaces, as at $e$. The iron plates of the masses $c\ c'$ at their ends are extended inwardly and afford concave cheeks or pole-faces $c^2$, but said ends are separated on a horizontal line by a space about equal to the distance between their concave faces and the armature, but outwardly said ends diverge at an angle and form V-shaped spaces, as shown. The spaces $e$, being parallel with the paths of the field magnetism, do not serve as air-gap resistances in the field-magnet circuits; but said interior spaces $e$, as well as those at the sides between the upper and lower masses of iron $c$ and $c'$, constitute air-gaps which intersect the armature magnetic circuits and afford desired resistance therein, as will be hereinafter further explained.

The armature B is surrounded longitudinally in a vertical plane by a main field-coil $f$, which has its straight sides housed in the central recesses of the iron masses $b\ b'$, and it is made in two properly-coupled sections or halves, which at their ends are so bent or curved as to afford spaces occupied by the armature-shaft. This main field-coil contains a small number of convolutions, and its exciting capacity is weak as compared with that of the armature-winding.

Closely surrounding the main field-coil and conforming thereto in shape there are other coils, each separate from the main field-coil, although of course they may all be mechanically united and handled as if they were two halves of a large field-coil. These other coils cannot be well shown separately in Fig. 3, but it may be understood that conforming in shape with the field-coil there are five independent but closely contiguous coils, which will be specially described and designated as "isolated" coils $f'\ f^2\ f^3\ f^4\ f^5$. The duty of these coils is to eliminate as far as possible the counter electromotive force of self-induction, which by rapidly-varied field magnetism is induced in those armature-coils which for the time being are passing under the commutator-brushes, as will be hereinafter explained, and coil $f^5$ serves in like manner for the armature. The coils $f'\ f^2\ f^3\ f^4$ contain a few turns of coarse wire and the coil $f^5$ a greater number of turns of fine wire. The armature is also closely surrounded longitudinally in a horizontal plane by another field-coil $g$, which I term the "counter field," and this is also constructed in halves and its ends are inside of the ends of the main field-coil and lie parallel with the ends of the armature above and below its shaft, and its straight sides fill or occupy the V-shaped gap between the upper and lower iron masses $c$ and $c'$. In this connection it is to be understood that I believe I am the first to employ counter field-coils in combination with cheek-faces divided into separate parts of like polarity and affording air-gaps on lines parallel with the conductors on the face of the armature, parts of said counter field-coils being closely adjacent to said air-gaps and parallel with the winding on the face of the armature. These features of my improvements have been proved to be as applicable to and as valuable in constant-current machines as in alternating-current machines, and it is to be understood that such claims, to be hereinafter recited, as include said features are to be restricted to alternating-current machines, although they will be more broadly claimed in separate applications for patent in connection with other claims more particularly pertaining to constant-current machines in various forms.

Two other horizontally-arranged counter field-coils $g'$ and $g^2$ surround the inner portions of the iron field masses $b$ and $b'$, filling the gaps or spaces between the inner and the outer portions of the iron field masses $b$ and $c$, $b'$ and $c'$, the ends of said coils being crosswise and parallel with the adjacent portions of the ends of the armature, but outside of the ends of the field-coil $f$. These counter field-coils $g$, $g'$, and $g^2$ are coupled together in series, and they are coupled in series with the main field-coil $f$ and also with the armature-coils. Each portion of the counter field forms, with such armature-coils as are overlaid by it, (and in which the current is in an opposite direction,) parts of a bifilar electric circuit, which is theoretically free from self-induction, or at least the counter field practically neutralizes or at least decreases self-induction in the armature-circuit very materially, those portions of these coils which occupy the outside V-shaped recesses effectively neutralizing the adjacent and parallel portions of the armature-coils.

The armature B embodies windings $h$, substantially corresponding with the winding of continuous-current armatures of the Pacinotti type, and like those the core of said armature B is toothed, but it is of drum form, and the core is composed of thin notched disks $i$, of soft iron, well insulated. As thus far described it will be seen that the iron in the field-magnet is in many comparatively small pieces, and hence the undue formation of magnetic circuits by the electric armature-circuits is greatly obviated and the counter electromotive force of self-induction in the armature-circuit is proportionately decreased. The iron in the armature-core between the coils being also divided into small portions is also conducive to rapid magnetic charge and discharge.

It is to be understood that divided pole-faces with intervening gaps or spaces for affording magnetic resistance, in combination with coils located in part within or adjacent to said spaces and also adjacent to the armature-winding, constitutes a feature of my invention which, although herein restricted to alternating-current machines, is to be covered in a general way by claims appropriate thereto in a separate application for Letters Patent. (See Serial No. 407,976.)

The commutator C is shown in section in

Figs. 1 and 2. In this commutator there is a set of long comparatively wide bars $k$, to each of which the terminals of appropriate armature-coils are connected. Between these live bars $k$ there are narrower dead bars, divided into three equal lengths, as at $l$ $l'$ $l^2$, and these are insulated from each other and from said wide bars, and they have no electric connections. With this commutator, as illustrated in Figs. 2, 4, and 5, four sets of brushes are employed. The triple sets $m$, $m'$, and $m^2$, and $m^3$, $m^4$, and $m^5$ are opposite each other on a horizontal line. These are the brushes by which the circuit is maintained from the line-wires through the armature-coils. The two sets of double brushes $n$ $n'$ and $n^2$ $n^3$ are located in a line at right angles or perpendicular to the real commutator-brushes. These double brushes are in this machine connected with coils which are not in the line-circuit.

The brushes of the $m$ series are alike, each brush being provided with several carbon contacts in line with each other in each brush, but the contacts in the three brushes of each set occupy different lines, so that when the two outer brushes bear upon two separate long wide bars $k$ the middle one will bear upon one of the short narrow bars $l'$, as illustrated in Fig. 5, and also so that when the two outside brushes bear upon short bars $l$ and $l^2$ in different lines the middle brush will bear upon an intervening wide bar $k$. The double brushes of the $n$ series, separately considered, are like either two of the other brushes, and each brush alternately bears upon a live bar $k$ and a dead bar $l$ or $l'$, as the case may be, as is illustrated in another connection in Fig. 12.

Referring now to Fig. 4, it will be understood that the armature B, its windings $h$, and the commutator-bars $k$ and $l$ are graphically merged for convenience in illustration. The field-coil $f$ is also shown in appropriate relation with the other isolated coils $f'$, $f^2$, $f^3$, $f^4$, and $f^5$, while the counter field-coils $g$ $g'$ $g^2$ are massed into one coil. The line-wires are shown at E and E', and commencing with wire E the electric connections will be followed by the use of numerals for designating the several conductors. The line-wire E connects with the terminal 1 of the counter field-coil $g$ $g'$ $g^2$, thence by wire 2 with one terminal of the true or main field-coil $f$, thence from the other field-terminal by wires 3 and 4 with the middle brush $m$, and then with a live bar $k$ and the terminals of two coils $h$ and $h$ of the armature-circuit. The wire 4 shunts at wire 5 to a resistance $r$, and thence by wire 6 branches to adjacent terminals of the extra or isolated coils $f'$ $f^2$, and the other terminals of these two coils, respectively, by way of wires 7 and 8 are coupled to the brushes $m'$ and $m^2$, which, as here shown, are resting on dead bars $l$, and hence are not then in connection with the armature-circuit. The other terminal line-wire, E', is reached at 9 from the armature-circuit by way of one branch from the middle brush $m^3$, which, as here shown, now bears upon a wide commutator-bar $k$, and hence connects with two terminals of the armature-coils $h$. As here shown, the brushes $m^4$ and $m^5$ rest on dead bars $l$, but when they are in contact with live bars the armature-circuit and line-wire E' are connected by way of the wire 10, coils $f^3$ $f^4$, and wires 11 and 12 to brushes $m^4$ and $m^5$, respectively, a resistance $r$ between wires 9 and 10 being common to both brushes and to both of said coils. The fifth coil $f^5$ is in communication with portions of the armature-coils by way of the four brushes of the $n$ series, which rest upon the opposite sides of the commutator, so that always at least one of these brushes is in connection with a live bar on a line perpendicular to the horizontal commutator-line on which the brushes of the $m$ series are located. One terminal of the coil $f^5$, by way of wire 13, connects with brush $n$ at the upper side of the commutator, and brush $n'$, by way of wire 14, also connects with coil $f^5$, but short-circuits some of its convolutions, as clearly indicated. The other terminal of the coil $f^5$, by way of wire 15, connects with a brush $n^2$ and the brush $n^3$, by way of wire 16, and in like manner short-circuits upon a few convolutions at that end of the coil $f^5$. In the position here shown it will be seen that the two brushes $n$ $n'$ are bearing upon a wide or live bar $k$, and that the diametrically opposite wide bar $k$ is also in like contact with the brushes $n^2$ $n^3$, and that each of the wires 13, 14, 15, and 16 is provided with a resistance $r'$. With a slight rotative movement of the armature the brush $n$ (for instance) will rest on a live bar $k$ and brush $n'$ on a dead bar $l$, and so, also, brush $n^3$ will rest on a live bar and brush $n^2$ on a dead bar, and a still further movement will place all four of these brushes on four separate live bars, and so on. The brushes of the $n$ series are located at those points of the commutator between which the counter electromotive force, which is induced by the pulsations of the alternating current in the field, is at its maximum. That electromotive force is balanced by an equal electromotive force of opposite direction induced by the varying field magnetism in the isolated coil $f^5$, Fig. 4. When the field magnetism exceeds the armature magnetism, the electromotive force in the coil $f^5$ overpowers the electromotive force between the brushes $n$ $n'$ and $n^2$ $n^3$, and sends through the armature a current which lags behind the main current, because said lagging current is caused by the electromotive force of self-induction, thus producing a shifting of phase in the armature magnetism. These four brushes of the $n$ series and their isolated coils constitute a circuit which has no connection with the main line, but which affords an effective regulation of the counter electromotive force of self-induction in the armature-circuit. In position, as shown in Fig. 4, the two line-terminals, by way of the opposite brushes and bars $k$ $k$, are in full connection with the armature-circuit. The armature and commutator on being slightly rotated in either direction will enable two brushes of each $m$ set to bear on one bar $k$, and each of these brushes will carry its portion of the current. The isolated coils $f'\,f^2$ and $f^3\,f^4$ will meantime be short-circuited by their resistances $r\,r$ in wires 5 6 and 9 10. These resistances $r$ should be of such capacity as to decrease or restrict to a moderate value the current caused by the counter electromotive force induced in the coils $f'\,f^2$ and $f^3\,f^4$. The suggested movement of the armature and commutator will also cause one brush of each set of the $m$ series to bear upon the next bars $k$, and hence all of the brushes will then connect with four bars $k$ and with the armature-coils which are connected therewith, and said coils will also be in circuit with the coils $f'\,f^2$ and $f^3\,f^4$, and the electromotive force induced therein will, by the rapidly-varying field magnetism, counterbalance a part of the electromotive force induced in these armature-coils by the field magnetism, while the resistances $r\,r$ will decrease (to a moderate degree) the current set up by that part of the electromotive force induced in the armature-coils which is not counterbalanced by the said coils $f'$, $f^2$, $f^3$, and $f^4$. With the armature still further slightly rotated the middle brushes $m^3$ will bear upon middle dead bars $l'$, and the outer brushes of each set will ride on separate bars $k$, and both will carry current as before, but the armature-coils connected with said bars will then be in circuit with the isolated coils or with the latter and resistances, as illustrated in Fig. 5, and thus the counter electromotive forces induced in said armature-coils will be balanced. It will now be seen that no armature-coil is ever short-circuited, but each as it passes the brushes is always in circuit with at least one resistance $r$ and with at least one isolated coil of the $f'\,f^2\,f^3\,f^4$ series, and, further, that the main or line current has direct communication with the armature-circuit, except during the short periods of contact of the brushes $m$ and $m^3$ with the middle portions $l'$ of the dead bars $l$ of the commutator, and at those times the main or line current flows through both resistances $r$ in parallel and by way of the other four brushes of the $m$ series.

Having described the electric connections in the machine, Figs. 1, 2, and 3, in connection with the diagram Figs. 4 and 5, I will now briefly designate the path of the alternating current through the machine in connection with said diagram. The alternating current entering at E passes through the counter field-coils $g\,g'\,g^2$ into the main field-coil $f$, therefrom over wire 3, where it divides into two branches 4 and 5. On branch 4 it goes by a direct path to the middle brush $m$ to the armature-circuit, and on branch 5 through resistance $r$ to wire 6, where it divides again. One branch of the current goes through the coil $f'$ by wire 8 to the brush $m^2$, and the other branch in the opposite direction through coil $f^2$ by wire 7 to brush $m'$ to the armature.

From the armature-circuit the current has exit to line by way of the three brushes $m^3$ $m^4\,m^5$, in part directly by way of brush $m^3$ and wire 9 and indirectly from brushes $m^4$ and $m^5$, thence over wires 11 and 12 through coils $f^3$ and $f^4$, and from thence in one path on wire 10, passing through resistance $r$ to wire 9 and line E'.

My motors contain appropriate field magnetic circuits and armature magnetic circuits. Referring to Fig. 3, it will be understood that the field magnetic circuit is divided into two main portions, one being wholly above and the other wholly below the axial line of the armature. Each of these two portions is divided into two parts, each crossing the armature-core, the one traversing the magnetic metal $b$ or $b'$ and the other the magnetic metal $c$ or $c'$, thus inducing in the core of the armature at its sides N and S on a horizontal axial line. There being no breaks or air-space resistance in either of these four divisions of the field magnetic circuit, except those essentially between the cheeks and the armature, it is obvious that the machine has a field magnetic circuit of very low magnetic resistance. The portion of the armature magnetic circuit which is specially controlled is also divided into two parts, one of which, referring to Fig. 2, for instance, is located at the right and the other at the left hand side of the armature, the armature-winding as a whole inducing in the armature-core N and S above and below the horizontal axial line. These portions of the armature magnetic circuit, which in each case include and traverse a portion of the armature-core and adjacent portions of the magnetic metal in the four cheeks, must and do cross the interior spaces between the cheeks, as well as the wide V-spaces between the outer cheeks, and hence said circuits are made or completed largely in air-space and are of relatively high magnetic resistance.

For securing still greater resistance and making the armature magnetic circuit a true bifilar circuit of low self-induction the counter fields or coils $g\,g'\,g^2$ are arranged with their sides in the gaps between the cheeks and parallel with the adjacent portions of the armature-winding, and the electric current traverses said counter field-coils in a direction opposite to the current in the adjacent armature-coils, it being understood that the establishment of the said bifilar circuit depends upon the substantially equal but opposite magnetism afforded by said counter field-coils and not upon any particular way of supplying them with an appropriate exciting-current.

Machines embodying my present invention not only contain, therefore, coils or windings which afford armature-magnetizing forces and field-magnetizing forces, but also those which afford still other magnetizing forces acting in opposition to the magnetizing forces of the armature; but it is not to be understood that the field-coils and counter field-coils must always be separate structures, because a single coil properly shaped and arranged with relation to the field metal and the armature can be relied upon for not only properly exciting a portion of the field, but also for affording magnetism induced by the adjacent armature-coils and thereby secure with the armature a bifilar or inductionless circuit. In such a winding the electric current flowing in one portion thereof is a true field-exciting current, but the current in another portion of the same winding flows in a direction opposite to the current in the adjacent armature-coils, and hence each of such windings or coils involves in itself a combination of field-coil and counter field-coil, as will be hereinafter more fully explained.

A set of three brushes and their carrier is specially shown in Fig. 9. They vary in length half the distance between the two live commutator-bars $k$. The middle brush $m$ is connected through the brush-holder stud $o$ with a main line-wire, but both of the side brushes $m'$ and $m^2$ are insulated from said stud $o$ and also from each other, because each has its own separate conductor, as at wires 7 and 8, Fig. 9. It will be understood that Fig. 9 illustrates such brushes as are used with the commutator and closed-circuit armature already described and also with the commutator for open-circuit armatures. (Illustrated in Figs. 7, 8, 10, and 11.) In this latter commutator there are live bars $k$ and the dead bars $l\ l'\ l^2$, as before described, but, as shown in Fig. 8, at the vertically-opposite sides of the commutator there are two pairs of narrow properly-insulated live bars $k'\ k^2$ and $k^3\ k^4$, and to these four narrow live bars the terminals of sections of the armature-winding are so connected as to secure two oppositely-located breaks or gaps in the armature-circuit. The armature-winding in this case is divided into two sections, and in each section the coils are permanently connected in series. Whenever the narrow live bars are on the upper side of the commutator there is no break between the adjacent terminals of the half-sections of armature-winding, but at the lower side said break is always wide open.

Outside of the bar-commutator, or at its outer end, there is a current-connecting commutator $C'$, composed of four segmental plates or half-rings $p\ p'\ p^2\ p^3$, insulated from each other. In Figs. 7 and 10 these segmental connecting-plates are shown as being of the same size, and they are insulated from each other, their ends being well separated, as shown in Fig. 10, on a diametrical line, and hence said parting-line is below the commutating or brush line shown in Fig. 8 whenever the narrow bars or gaps occupy a vertical line. For a better understanding of this connecting-commutator reference will now be had to the substantially similar commutator $C^2$ of Fig. 6, which is shown as coupled to the appropriate narrow live bars $k'\ k^2$ and $k^3\ k^4$, which afford the gaps or breaks in the armature-circuit. The segmental plates $p\ p^3$ are here somewhat larger than the others $p'\ p^2$, but as they are revolved the two arms of the well-insulated connecting-brush $p^4$ places plates $p$ and $p'$ (or $p^2$ and $p^3$) in electric communication, and, as shown in Fig. 6, the half-bar $k'$ is connected with segment $p'$ by way of wire 13, and half-bar $k^2$ with segment $p$ by way of wire 14, and hence the brush $p^4$ will connect said wires and bars and close the one gap or break which is in the upper half of the commutator. In like manner will the brush $p^4$ connect bars $k^3\ k^4$ by way of wires 15 and 16 and segments $p^2$ and $p^3$ as soon as the break at $k^3\ k^4$ reaches the upper half of the commutator and followed promptly by a break at the other gap. It will be seen that the main brushes of this commutator are not set on a diametrical line, as is the case with the spaces between the ends of the contact-plates at $C'$ or in $C^2$, and therefore the gap in the armature-circuit which (for the time being) is at the upper side of the armature is always closed by the connecting-brush $p^4$ before said gap reaches the main brushes, regardless of the direction in which the armature may be rotated; and it will also be seen that the gap will be opened just after the main brushes have been passed. The duty of this connecting-commutator consists in part in cutting those portions of the armature-winding out of circuit which (for the time being) do not work, but which if left in circuit would increase self-induction in the armature, and, further, in connecting only those portions of the armature-winding which are to work with full power. As shown, however, in Fig. 6, the counter field $g$, the main field $f$, and the separate coils $f'$, $f^2$, $f^3$, and $f^4$, with their resistances $r\ r$, are all as before described, and the paths of the current through the machine from line-wires E to E' are similar to those already described in connection with Fig. 4, except that in this case the path through the armature-circuit takes in the connecting-commutator $C^2$ in passing over the closed gap or break.

The armature-coils of Fig. 6, which, for the time being, are at the upper side, above and between the two groups of brushes, are always connected in series. In the lower half of the armature-circuit, below and between the groups of brushes, there will always be either one or both gaps or breaks, and hence no current can circulate in those coils, with a consequent decrease in self-induction. The brushes being all located above the axial line of the commutator, (or armature,) only one of the gap or break will be passing the groups of brushes at one time, and therefore no actual break can occur above the brushes, while below there will be one break alternating with both breaks or gaps. Although in this organization a considerable proportion of the armature-winding is always out of circuit, the machine is quite effective, because the current flows only half the time through any portion of the winding, and therefore more current can be carried than would be safe if all of the coils or winding were in constant service.

In reversible motors the triple main brushes already described are essential; but in a non-reversible machine double brushes may be relied upon, as illustrated in Fig. 13, wherein the connecting-commutator $C^3$ is shown at the central portion of the figure. In this case the armature-circuit has six gaps or breaks at regular intervals of sixty degrees, and hence the connecting-commutator $C^3$ has two annular sets of triple segmental contact-plates and four connecting-brushes. The upper outer brush $p^5$ and the lower inner brush $p^6$, as shown, have closed the upper and the lower gaps, but the other four gaps are now open. As the armature moves in the direction of the arrow, brushes $p^7$ and $p^8$ will promptly close the two gaps which next reach the main or live brushes; but these gaps will be promptly opened after one-third of a revolution, and so on, the armature-circuit having therein always either two or four gaps or breaks. In this machine the path of the current from line-wire E is by way of wire 1, through the main field-coil $f$, thence by wire 2 in series through the counter field-coil $g$ to 3, where the path branches, to the lowest brush $m$ of the upper right-hand brushes, by wire 4, and also by wire 5, through resistance $r$ and wire 6 to the isolated coil $f'$, and thence by wire 7 to the uppermost right-hand brush $m'$. On the opposite or lower left-hand side the outward path of the current is from the uppermost line-wire brush $m^2$, by way of wire 10, direct to line E', and also from the lower live brush $m^3$, indirectly by wire 13, through coil $f^2$ to wire 14, through resistance $r$ to wire 10, and thence to the line E'. With this organization of Fig. 13 more than half of the armature-coils are worked in series, because between the upper right-hand live brushes at $m'$ and the upper left-hand brushes at $n$ the gap or gaps are always closed, and the same is true of the gap or gaps between the lower left-hand live brushes at $m^3$ and the right-hand lower brushes at $n^3$; but between the two left-hand sets of brushes and oppositely between the two right-hand sets $n^2$ and $m$ the gaps are always open, and hence the alternating current entering at $m\ m'$ passes to and out at $n$ and $n'$ on wires 8 and 9, around to $n^2\ n^3$, and thence to $m^2\ m^3$, thus including considerably more than one-half of the armature-coils in series.

In Fig. 12 a slight modification of this system of commutation is illustrated for use with a non-reversible motor. The gap or break is shown at the narrow bars $k'\ k^2$, and these are coupled with the segmental plates $p\ p'$, and the connecting-brush $p^4$ coöperates therewith, as before described. In this case one of the brushes is connected directly with a line-wire E, and the other is also connected therewith, but has an intervening resistance $r$ and an isolated coil $f'$. With this arrangement a little less than half the armature-coils will be in circuit at the same time, but much greater current density may be employed, because said coils are intermittingly put into and out of circuit and the working electromotive force will be about the same as with the closed-coil armature.

In Fig. 14, Sheet 5, I illustrate the main portions of a four-pole motor devised by me for use with alternating currents in accordance with my invention. The drum-armature B' has a toothed core of laminated iron, and it is appropriately wound, and it is to be provided with a commutator constructed in accordance with the disclosures herein presented, due provision being made against short-circuiting the electromotive forces by the use of the isolated coils $f'$, &c., and resistances. The magnet poles, faces, or cheeks are eight in number, with intervening angular spaces, and form four horseshoe-shaped masses of laminated iron, affording four magnetic circuits. Four massed coils are also employed, as shown, and these each include true field-coils and the isolated coils already described. A longitudinal portion or side $q$ of each of the massed coils is located in the central recess of its appropriate mass of iron, and this portion does duty as a true field-coil; but another portion $q'$ of each coil is outside of the magnetic field-circuit and in the adjacent angular V-space between the masses of iron, and hence this portion of each coil does duty as a counter field-coil, the same as the entire coils $g\ g'\ g^2$ of the previously-described bipolar organization. The current in the portions $q'$ of the coil being opposite in direction to that in the armature-coils, breaks up or destroys the magnetic circuits induced by the armature-current adjacent to the V-shaped spaces, the latter affording wide air-gaps, which operate as resistances for obstructing the said magnetic circuits of the armature at those points.

So far as my knowledge extends, no alternating-current motor prior to my invention has been so organized as to involve a low self-induction to an effective and valuable degree when operated under such a high number of alternations as are generally employed; and I believe my motors to be the first which are able to overcome the difficulties heretofore incident to short-circuiting electromotive forces under the commutator-brushes, because of the non-existence of a neutral line in alternate-current motors.

In my motors I secure the good results which would be incident to neutral lines because my commutator in either of the forms described renders the short-circuiting of armature-coils impossible, and the electromotive forces induced in those coils which, for the time being, are in communication with the brushes are balanced by the electromotive forces of equal phase, (but in opposite direction,) which are taken from or through the separate or isolated field-coils $f'$, $f^2$, $f^3$, or $f^4$, and my armature is of very low self-induction.

In my motors I also secure a high degree of working electromotive force, as compared with or in proportion to the total electromotive force supplied thereto or consumed, because I have rendered my machines capable of operating with but little self-induction, and the necessary reversals of magnetism at each alternation of the current causes but little retardation or loss of the current phase against the phase of the electromotive force, and enables the motor to start promptly and without liability of burning out the armature-coils under full current in the event of non-rotation of the armature.

It will be seen that in my bipolar machines I have shown the field iron divided into four masses or sections, and three independent counter field-coils are located in the air-gaps between those sections, and said coils are connected in series with each other and to the armature-coils and field-coils. While this organization affords highly satisfactory results, I have practically demonstrated an effective value in the use of magnetic metal divided only into two sections, accompanied by but one counter field-coil, applied, as at $g$, between the two sections. Approximately good results are also obtained by the use of field iron in but one section, affording cheek-pieces recessed in the middle for the reception of a single counter field-coil.

It is to be understood that I believe that my improvements herein disclosed involve a novel mode of converting alternating electric currents into effective mechanical energy, and I comtemplate making the same the subject of a separate application for Letters Patent.

Having thus described my invention, I claim as new and desire to secure by Letters Patent—

1. In an electric motor, adapted to be operated by alternating currents, the combination substantially as hereinbefore described, of a field-coil, an armature having coils connected in series in the alternating-current circuit, and a counter field-coil, closely surrounding said armature, and also in series with the field-coils, and with the armature-coils, but organized as described, to permit the current to flow in said counter field in a direction opposite to the current in the armature-circuit, whereby the coils of the armature, and the said counter field, will afford a non-inductive circuit, and operate as means for counterbalancing the electromotive forces of self-induction induced in the several armature-coils by the alternations of the magnetic field of the armature-current.

2. In an electric motor adapted to be operated by alternating currents, the combination substantially as hereinbefore described, of a main field-coil; an armature having coils connected in series in the alternating electric circuit; means for applying the current to said armature-coils, in whole or in part; isolated field-coils, which develop electromotive forces which counterbalance the electromotive forces induced in the armature-coils by reversals of magnetism; and a counter field-coil, or coils, closely surrounding the armature, and oppositely excited by the main current in series to the armature and main field-coil, for forming a bifilar or non-inductive circuit, in connection with the armature-coils, and thereby decreasing the self-induction of the armature.

3. In an electric alternating-current motor, the combination substantially as hereinbefore described, of armature-coils connected in series; a main field-coil; separate or isolated coils conforming with, and in close proximity to, the main field-coil, and a commutating device, which delivers the current to, and takes it from the armature-circuit, and which when it makes connection with any two adjacent commutator-bars, places one or two of said isolated coils, and a suitable resistance, in circuit with the armature-coil between those two commutator-bars, for inducing in the armature-coils, and in said isolated coils, opposing electromotive forces.

4. In an electric alternating-current motor, the combination of an armature, carrying coils connected in series; an inside field-coil; separate or isolated coils conforming to and massed with the field-coil, and one or more outside, or counter field-coils, connected in series with the field-coil.

5. In an electric alternating-current motor, the combination substantially as hereinbefore described, of an armature having coils connected in series; a field-coil; a commutator having brushes which deliver line current to, and take it from the armature-circuit, and other brushes, at right angles to the live brushes, which connect oppositely-located armature-coils, with each other, by way of a circuit outside of the armature, and which includes a coil conforming with, and in close proximity to, the field-coil.

6. In an electric alternating-current motor, the combination substantially as hereinbefore described, of an armature; a field-coil; and a commutator provided with brushes and electrical connections, which afford a direct path for the current to the armature-circuit from the line-wire, and an indirect path (or shunt-wire connection), to said circuit, which passes through a resistance, and traverses an isolated coil contiguous to the field-coil, in such a direction that the electromotive force induced by the rapidly-varied field magnetism in said isolated coil, will be opposite in direction to that of the electromotive force induced in the armature-coil, which is connected in series, with said isolated coil.

7. In an electric alternating-current motor, the combination substantially as hereinbefore described, of an armature; a field-coil; and a commutator provided with brushes and electric connections, which afford a direct path for the current from the line-wire to the armature-circuit, and two indirect paths, by which the current may reach the armature-circuit, at times by the direct path, next simultaneously by the direct path, and one of the indirect paths, next by the two indirect paths, and next by the direct and the other indirect path, said paths including a resistance and each indirect path including a separate coil, in intimate relation to the field-coil, and with the current in one indirect path, opposite in direction to that in the main field-coil, and in the other indirect path, in the same direction, as in said field-coil.

8. In an electric alternating-current motor, the combination with the armature-circuit, and field-circuit, an independent coil in close proximity to the field-coil, and means for connecting the field, and armature circuit, with a line-circuit, and further means for connecting those portions of the armature-circuit, which for the time being, are midway of the line-circuit connections, with said independent circuit.

9. In an electric alternating-current motor, the combination substantially as hereinbefore described, of an armature; a field-coil; an independent coil conforming with, and adjacent to the field-coil; a commutator having brushes for connecting line-wires with the armature and field coils; and brushes at right angles to the live brushes, respectively connected with the opposite ends of said independent coil.

10. In an electric alternating-current motor, the combination substantially as hereinbefore described, of a field-coil, an armature; a commutator having a set of live bars, and intervening dead bars, and brushes for connecting the armature with line-wires; a coil in close proximity to the field-coil, but independent thereof; two pairs of brushes oppositely located, and at right angles to the live brushes, the contact-surfaces of the brushes of each pair, occupying different lines, and alternately both bearing upon one live bar; then upon a live bar, and also upon a dead bar; then upon two live bars; and conductors from each pair of brushes, which respectively connect with an appropriate terminal of said independent coil, and with an interior convolution of said coil.

11. The combination of an armature, and a commutator provided with live bars, each coupled to terminals of two coils; and also provided with dead bars, between said live bars, and brushes for said commutator, which are set one in advance of another, so that, while one is bearing upon a live bar, the other will bear upon a dead bar.

12. The combination of an armature, and a commutator provided with live bars, each coupled to terminals of two armature-coils; and also provided with intervening dead bars, divided into lengths insulated from each other, and from said live bars; and brushes having contact-surfaces which are set on different lines, for enabling them to alternately bear upon the live bars, and appropriate portions of the dead bars.

13. In an electric alternating-current motor, the combination substantially as hereinbefore described, of an armature; magnetic metal affording appropriate cheeks or pole-faces; a field-coil which longitudinally surrounds the armature, and is partially housed in said metal, and other field-coils at right angles to the first, also surrounding the armature, and externally surrounding portions of said masses of magnetic metal, adjacent to said pole-faces.

14. In an alternating-current electric motor, the combination substantially as hereinbefore described, of an armature, a field-coil, and laminated magnetic metal affording appropriate cheek-pieces, subdivided and having air-gaps between the divisions, some of which gaps are parallel with the paths of the field magnetism, and all of which, intersect the paths of the armature magnetism, as described, to afford a magnetic circuit of low resistance for the field magnetism, and a magnetic circuit of high resistance for the armature magnetism.

15. In an electric alternating-current motor, field-cheeks, or pole-faces, afforded in part by an interior laminated mass of iron, and also in part by a second laminated mass of iron, surrounding the first, insulated and separated therefrom at all points, by air-spaces, each pair of adjacent cheeks afforded by said two masses of iron, being of like polarity, and constituting substantially one cheek, divided into two parts, separated by an air-space.

16. In an electric alternating-current motor, the combination of a pair of end plates, each affording supports for the armature-shaft, and serving as the base of the machine; skeletonized non-magnetic plates, at the inner sides of said end plates, and secured thereto; and masses of laminated iron, supported between the non-magnetic plates, and affording pole faces or cheeks, for the field-magnets.

17. In a bipolar electric alternating-current motor, an armature-inclosing structure or frame, composed of an upper and a lower section, connected, but separable on a line with the axis of the armature, and each section embodying two end plates, two separate masses of laminated iron affording appropriate cheeks or pole faces; plates of non-magnetic metal interposed between the laminated masses of iron, and the end plates, and insulated clamping-bolts, for firmly binding the several parts of each section, and other bolts for uniting said sections.

18. In an electric alternating-current motor, the combination substantially as described, of an armature provided with coils connected in series, to one commutator and another commutator for maintaining gaps or breaks in such portions of the armature-circuit, as are not required for affording a path between the brushes which enable the line-current to be delivered to, and to be taken from said circuit.

19. In an electric alternating-current motor, the combination substantially as hereinbefore described, of an armature, carrying coils which in groups, are connected in series; commutator-bars to each of which appropriate terminals of armature-coils are connected; other, side by side, commutator-bars, to each of which a terminal of a group of armature-coils is connected; and a connecting and disconnecting commutator, which successively connects the groups of armature-coils in series, and then breaks said connections, for establishing a series connection of more than one-half of the armature-coils in the line-circuit.

20. In an alternating-current motor, the combination substantially as hereinbefore described, of an armature; masses of magnetic field metal in separate magnetic circuits, divided by spaces or air-gaps; and field-coils, which in part occupy spaces inside of the magnetic field-circuits, and appropriately magnetize said field metal, and in part occupy said air gaps or spaces, between and outside of the magnetic field-circuits, and in close proximity to the armature, for neutralizing self-induction of the armature-current, the electric current flowing in a portion of each field-coil, in a direction opposite to that in the adjacent armature-coils.

21. In an electric motor specially organized to be driven by alternating currents, the combination substantially as hereinbefore described, of armature-coils, and field-coils, affording respectively appropriate magnetic circuits, and a counter field-coil closely adjacent to coils of the armature electrically excited for inducing magnetism opposite and substantially equal to that induced by the closely-adjacent armature-coils, and eliminating armature self-induction, by affording a bifilar or inductionless circuit with the armature.

22. In an electric motor specially organized to be driven by alternating currents, the combination substantially as hereinbefore described, for eliminating armature self-induction of coils, or windings, which when appropriately excited, afford field-magnetizing forces, and armature-magnetizing forces, and also magnetizing forces acting with substantially equal power in opposite direction to appropriate portions of the armature-magnetizing forces, and affording with said portions of the armature, magnetic forces bifilar or inductionless magnetic circuits.

RUDOLF EICKEMEYER.

Witnesses:
LESLIE M. SAUNDERS,
JAMES S. FITCH.